United States Patent [19]
Boehmer et al.

[11] Patent Number: 5,474,099
[45] Date of Patent: Dec. 12, 1995

[54] NON-STICK TREATMENT FOR ELASTOMERIC SLIT VALVES

[75] Inventors: Dennis A. Boehmer, Beavercreek; James R. Kunce, Springfield; David O. Werbil, Huber Heights, all of Ohio

[73] Assignee: Vernay Laboratories, Inc., Yellow Springs, Ohio

[21] Appl. No.: 362,910

[22] Filed: Dec. 23, 1994

[51] Int. Cl.⁶ .................................................. F16K 15/16
[52] U.S. Cl. ............................................. 137/15; 137/846
[58] Field of Search ........................... 137/15, 843, 844, 137/846–850

[56] References Cited

U.S. PATENT DOCUMENTS

| | | | |
|---|---|---|---|
| 4,535,818 | 8/1985 | Duncan et al. | 137/846 |
| 4,612,960 | 9/1986 | Edwards et al. | 137/846 |
| 5,039,401 | 8/1991 | Columbus | 137/843 X |
| 5,100,394 | 3/1992 | Dudar et al. | 604/283 |
| 5,261,459 | 11/1993 | Atkinson | 137/846 |
| 5,312,363 | 5/1994 | Ryan et al. | 604/167 |

*Primary Examiner*—Robert G. Nilson
*Attorney, Agent, or Firm*—Biebel & French

[57] ABSTRACT

A non-stick treated valve including a pair of cooperating elastomeric surfaces positioned to engage each other to control fluid flow through the valve. A non-stick coating is applied to the cooperating surfaces to facilitate separation of the surfaces from each other during opening of the valve. The non-stick coating is in the form of an oily substance such as a fluid lubricant for forming a fluid film coating on the cooperating surfaces. In addition, the coating material is formed of a material which is dissimilar from the material forming the cooperating surfaces.

27 Claims, 5 Drawing Sheets

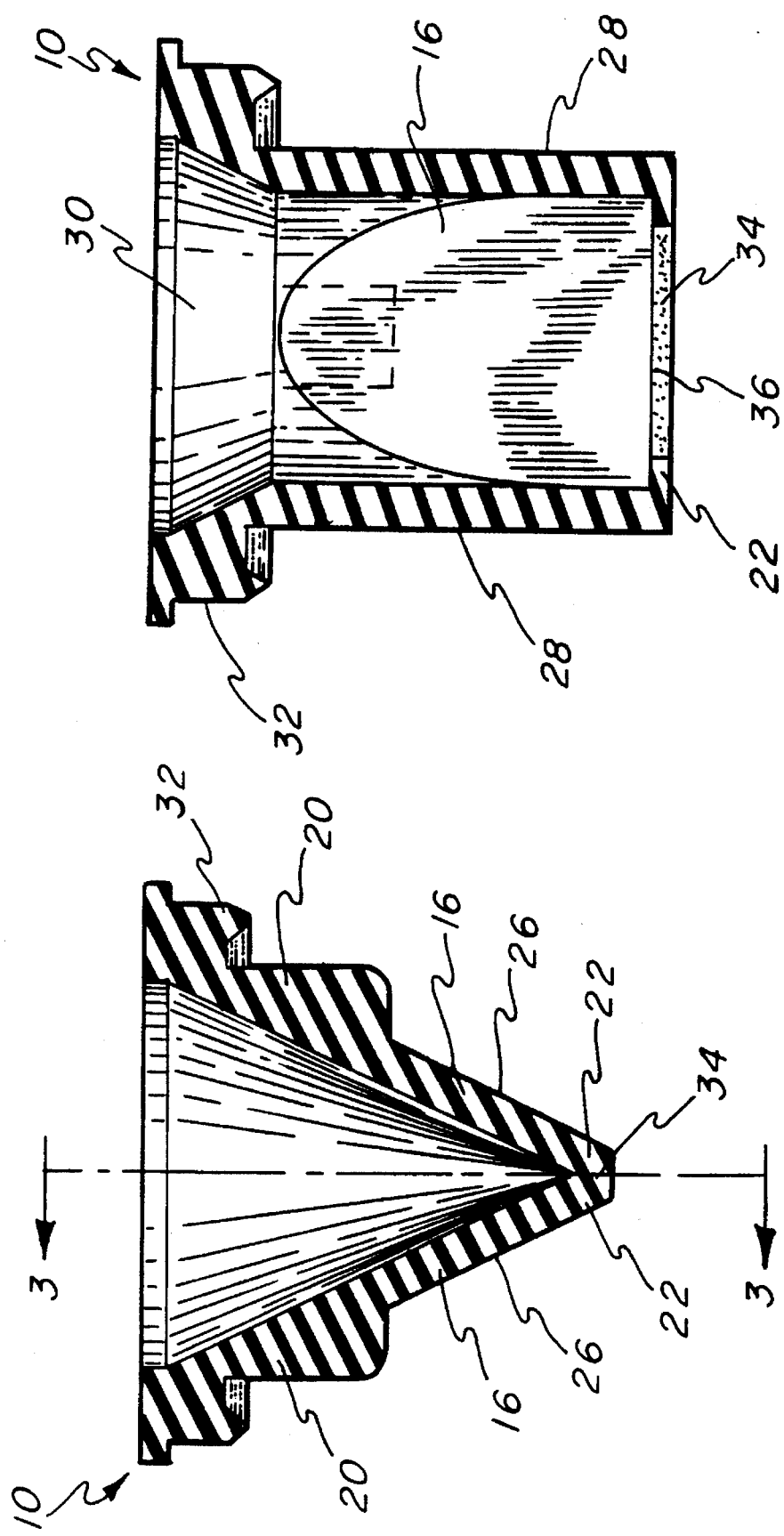

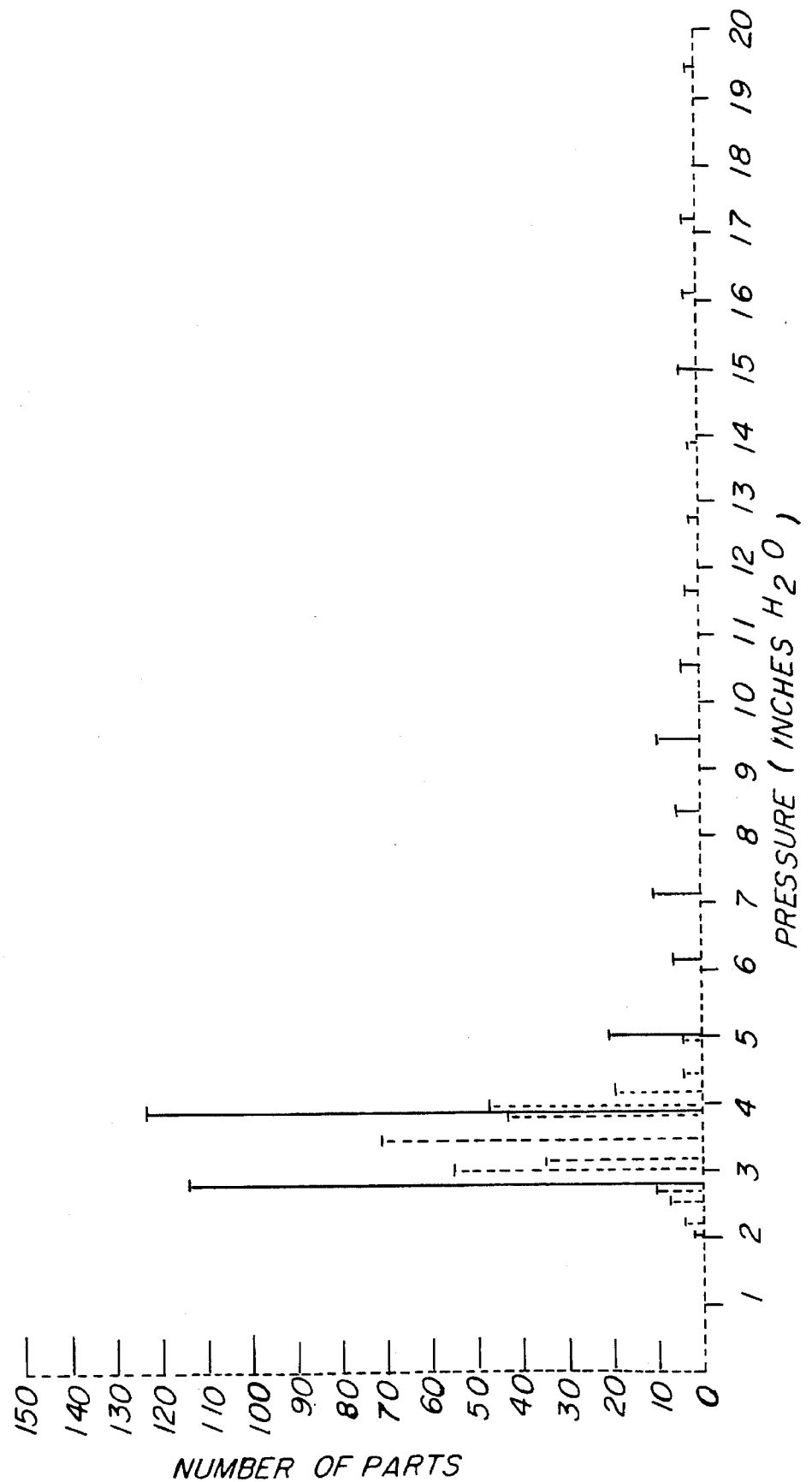

5,474,099

NON-STICK TREATMENT FOR ELASTOMERIC SLIT VALVES

BACKGROUND OF THE INVENTION

The present invention relates generally to flow regulation valves, and more particularly, to a non-stick treatment for use with flow regulator valves adapted to permit substantially free flow through the valve in a first direction, while preventing flow through the valve in a second, opposite direction. Even more particularly, the present invention provides a lubricating coating for use in a duckbill valve to ensure opening of the valve to permit fluid flow in the first direction.

Duckbill valves have been known for some time and have been used in a variety of applications, examples of assemblies incorporating such valves being shown in U.S. Pat. Nos. 4,535,818 and 4,612,960. Such an assembly typically includes a housing into which is mounted a resilient flow regulator member or valve element having as its primary operative components a pair of lips arranged in a converging relationship from an open end at the base of the lips to a normally closed outer end. At the closed end of the regulator, the lips are located adjacent each other so as to define a normally closed slit therebetween. The regulator is mounted within the housing in a sealed relationship so that flow through the housing must pass through the regulator as well. In a first or forward direction, flow enters the housing and passes into the regulator through the open end, moving toward the normally closed end. The flow pressure against the resilient lips opens the slit, allowing the flow to pass out of the regulator and the housing. When flow enters the housing from a second or a reverse direction, the flow contacts the regulator at its normally closed end, with the flow pressure against the resilient lips holding the slit in its closed position, thereby preventing flow through the regulator assembly.

One application for a valve of this type is as part of a medical solution administration set. Such a set is used to deliver fluids such as plasma, medicines, and the like from a fluid supply source, such as a bottle or bag, intravenously to a patient. In such an application, it is particularly desirable to have the resilient flow regulator member open at fluid pressures of 8" of water or less.

In order to ensure that the regulator member responds quickly to small changes in fluid pressure for opening and closing the regulator, the regulator is formed of a very soft material, such as silicone having a durometer of 60 shore A or less. Usually, the regulator is molded with the normally closed end being unslit, and a knife cuts the slit subsequent to the molding operation such that a pair of complementary mating surfaces are defined on the opposing lips.

One problem with forming the regulator of soft elastomeric materials is that such soft materials tend to have an increased tackiness such that the complementary cooperating surfaces on the lips forming the slit may have a tendency to stick to each other. The tendency of the lips to stick to each other is affected by ambient conditions such as temperature and humidity, and sterilization techniques such as gamma radiation, as well as by the amount of time that the cooperating surfaces of the lips are allowed to remain in undisturbed engagement with each other. As a result of the lips sticking to each other, it has proven difficult to ensure consistent performance within a group of regulators produced to the same specifications, and a certain percentage of prior art regulators have been found to resist opening until a pressure greater than a desired maximum pressure, such as 8" of water, is applied. In some cases, an operator must pump fluid at an increased pressure against the regulator to obtain an initial separation of the lips, and occasionally the adhesion between the cooperating surfaces of the lips is such that the valve regulator will resist opening at even very large fluid pressures applied to the open end of the regulator.

Accordingly, there is a need for a fluid regulating valve incorporating a regulator wherein the regulator structure is such that opening of the regulator during fluid flow is ensured.

SUMMARY OF THE INVENTION

The present invention provides a non-stick treated valve including a pair of cooperating elastomeric surfaces positioned to engage each other to control fluid flow through the valve, and a non-stick or lubricating coating applied to the cooperating surfaces to facilitate separation of the cooperating surfaces from each other. The valve is preferably a duckbill valve including a valve body having a pair of opposed lips connected by side walls to form a fluid passage through the valve. The lips have inner surfaces extending in converging relation to each other to define a slit at an outlet end of the valve and the cooperating surfaces are defined on the inner surfaces of the lips at the slit.

In a further aspect of the invention, the non-stick coating is formed of a substance which is substantially immiscible in blood, plasma and medications whereby the valve is particularly adapted to be used in conjunction with an administration set for administering fluids to a patient.

In a further aspect of the invention, the material forming the valve body is different or dissimilar from the material forming the non-stick coating. In other words, the non-stick coating material is incompatible with the valve body material such that the non-stick coating will not be absorbed into the valve body, but rather, will form a lubricating film on the surface of the valve body.

In a further aspect of the invention, the non-stick coating is a lubricating fluid which may be dispensed through a hollow needle. In applying the non-stick coating to the valve body, a microdrop of the lubricating fluid is produced at the end of the needle and the end of the needle is inserted into an open end of the valve and through the slit. As the needle passes through the slit, the lubricating fluid is deposited onto the cooperating surfaces, and the needle is subsequently withdrawn from within the valve body.

Therefore, it is an object of the present invention to provide an elastomeric valve having a non-stick coating to facilitate opening of the valve.

It is a further object of the invention to provide a duckbill valve having a non-stick coating located between converging lips.

It is yet another object of the invention to provide such a valve wherein the non-stick coating forms a film between cooperating surfaces of the valve to inhibit sticking.

Other objects and advantages of the invention will be apparent from the following description, the accompanying drawings and the appended claims.

BRIEF DESCRIPTION OF THE DRAWINGS

FIG. 2 is a sectional view of the regulator member shown in FIG. 1;

FIG. 3 is a sectional view taken along line 3—3 in FIG. 2;

FIG. 8 is a histogram comparing valves treated with the non-stick treatment of the present invention versus untreated valves.

DETAILED DESCRIPTION OF THE PREFERRED EMBODIMENT

Figure 1:
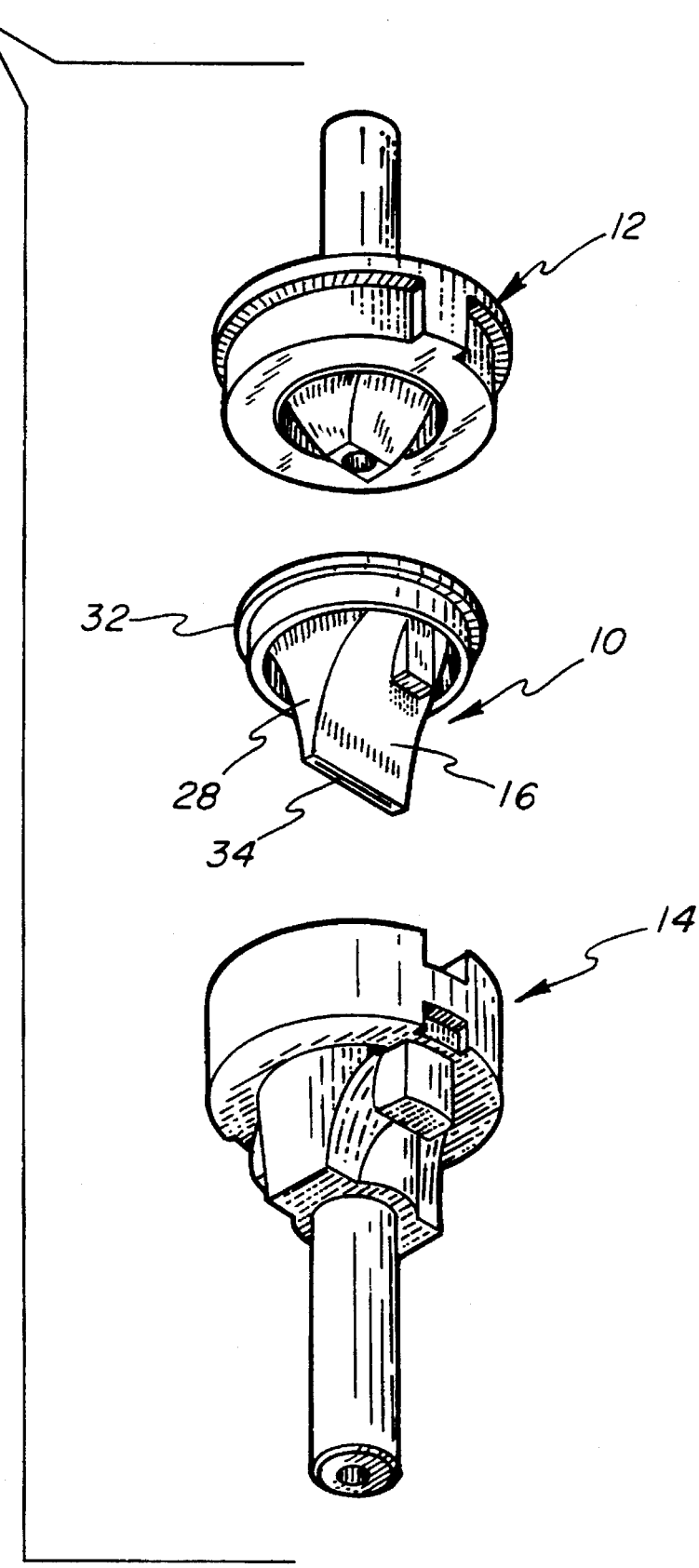
FIG. 1 is an exploded view of an assembly including a regulator for incorporating the non-stick treatment of the present invention.

Referring to FIG. 1, the non-stick treatment of the present invention is particularly adapted to be used on valves which include normally closed lips cooperating with each other to control flow through a fluid path. For example, the non-stick treatment may be applied to a duckbill fluid regulator 10 which is designed to be incorporated into an assembly including a housing formed with an inlet housing portion 12 and an outlet housing portion 14. The inlet and outlet housing portions 12, 14 cooperate with each other to enclose the regulator 10 in a manner which is further described in the above-noted U.S. Pat. No. 4,612,960, assigned to the assignee of the present invention and incorporated herein by reference.

Referring to FIGS. 2 and 3, the regulator 10 is preferably formed of a soft elastomeric material, such as silicone having a durometer of 60 shore A or less. The regulator 10 includes a pair of lips 16, each lip 16 is substantially planar having a base region 18 and an outlet end 22. In addition, the lips 16 include converging inner walls 24 and converging outer walls 26 wherein each of the inner walls 24 is substantially parallel to a respective outer wall 26.

Curved side walls 28 interconnect the lips 16 and define an open end 30 for the regulator opposite from the outlet end 22 of the lips 16. In addition, an outwardly extending flange 32 may be provided adjacent to the base region 20 to facilitate mounting the regulator 10 within the assembly.

A slit 34 is defined at the outlet end 22 of the lips wherein the slit 34 is in the form of a cut through a region of material joining the lips 16 at the outlet end 22. For example, the slit 34 may be cut by a thin knife after the regulator 10 has been molded. The slit is defined by a pair of opposing complementary surfaces 36 which separate to permit forward flow from the open end 30 through the outlet end 22, and which cooperate with each other in sealing engagement to prevent fluid flow through the regulator 10 in a reverse direction from the outlet end 22 to the open end 30.

In accordance with the present invention, the cooperating surfaces 36 are coated with a non-stick material, as depicted by stippling on the surface 36 in FIG. 3. The non-stick coating is preferably a slippery or lubricious substance such as a fluid lubricant formed of a material which is dissimilar from the material forming the regulator 10 such that the coating will not be absorbed into the regulator material and will form a fluid film coating along the slit 34. Specifically, when the regulator 10 is formed of silicone, which is a cross-linked polymer, the coating material is preferably formed of a non-cross linked polymer, such as fluorosilicone fluid.

Fluorosilicone fluid is a preferred coating when the present invention is intended for use in medical applications inasmuch as fluorosilicone fluid is a medically accepted substance for use in applications such as administration sets for conveying fluids to a patient. In addition, fluorosilicone fluid is substantially immiscible in fluids such as blood, plasma and medications, as well as other fluids, such that a fluorosilicone fluid coating will remain intact on the surfaces 36 forming the slit 34.

Figure 6:
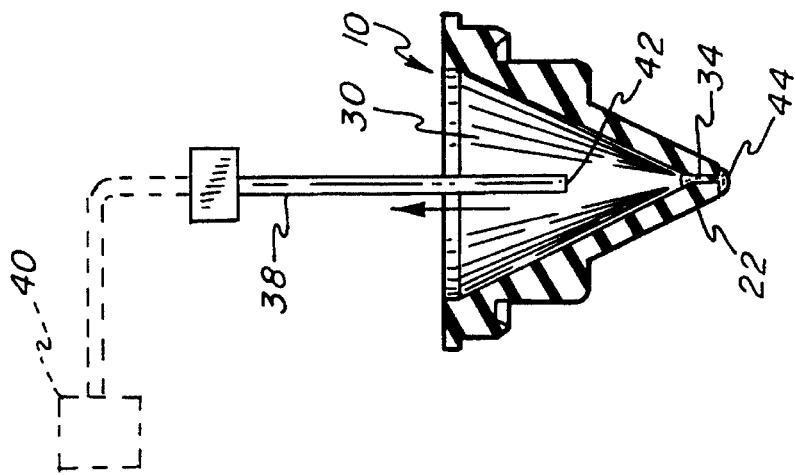
FIGS. 4–6 are sectional views through the regulator member of FIG. 1 showing the steps of providing a non-stick treatment to the present valve.
Figure 5:
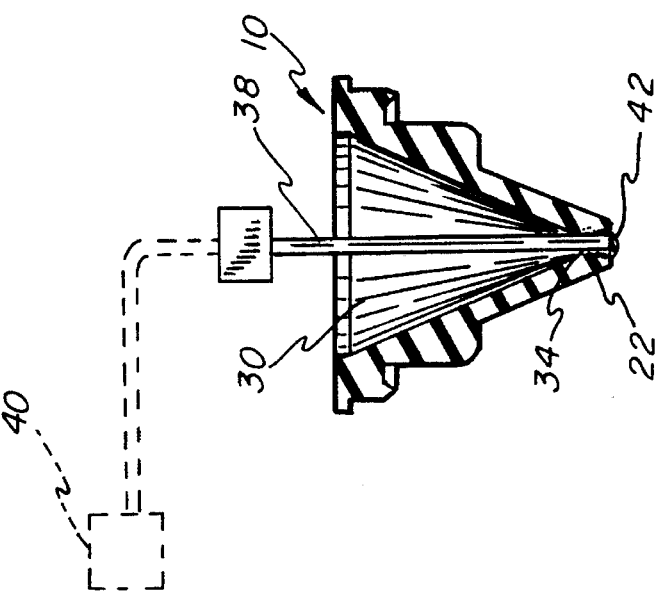
Figure 4:
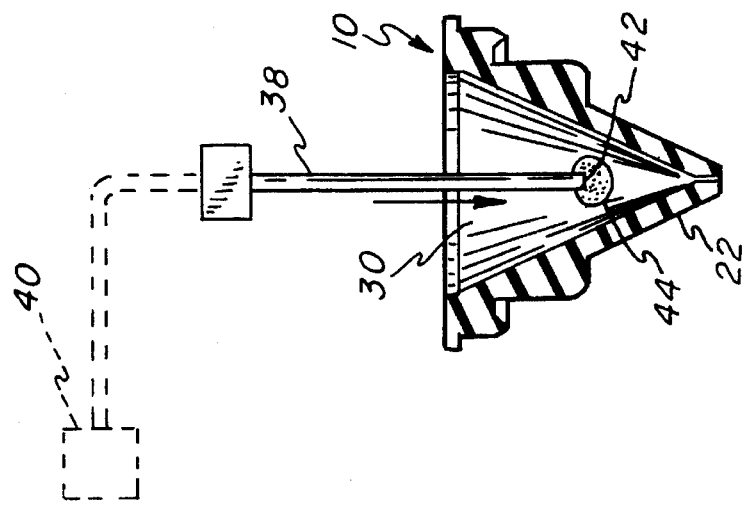

Referring to FIGS. 4–6, the steps of providing the non-stick coating of the present invention on a valve are illustrated. In order to distribute a controlled amount of coating material onto the cooperating valve surfaces 36, a thin hollow needle 38 is provided connected to a fluid reservoir 40 for supplying a predetermined amount of non-stick fluid to an open tip end 42 of the needle 38. The needle 38 forms a dispensing means which is initially moved into association with the open end 30 of the regulator 10, as shown in FIG. 4. As the needle 38 is moved into the regulator 10, a microdrop 44 is formed at the end 42 of the needle 38. As seen in FIG. 5, the needle tip 42 is subsequently moved forwardly to penetrate the slit 34, at which time the microdrop is caused to wet along the surfaces 36 forming the slit 34. The needle 38 is then extracted from the slit 34, as shown in FIG. 6, leaving a non-stick fluid film coating along the surfaces 36 of the slit 34.

Figure 7:
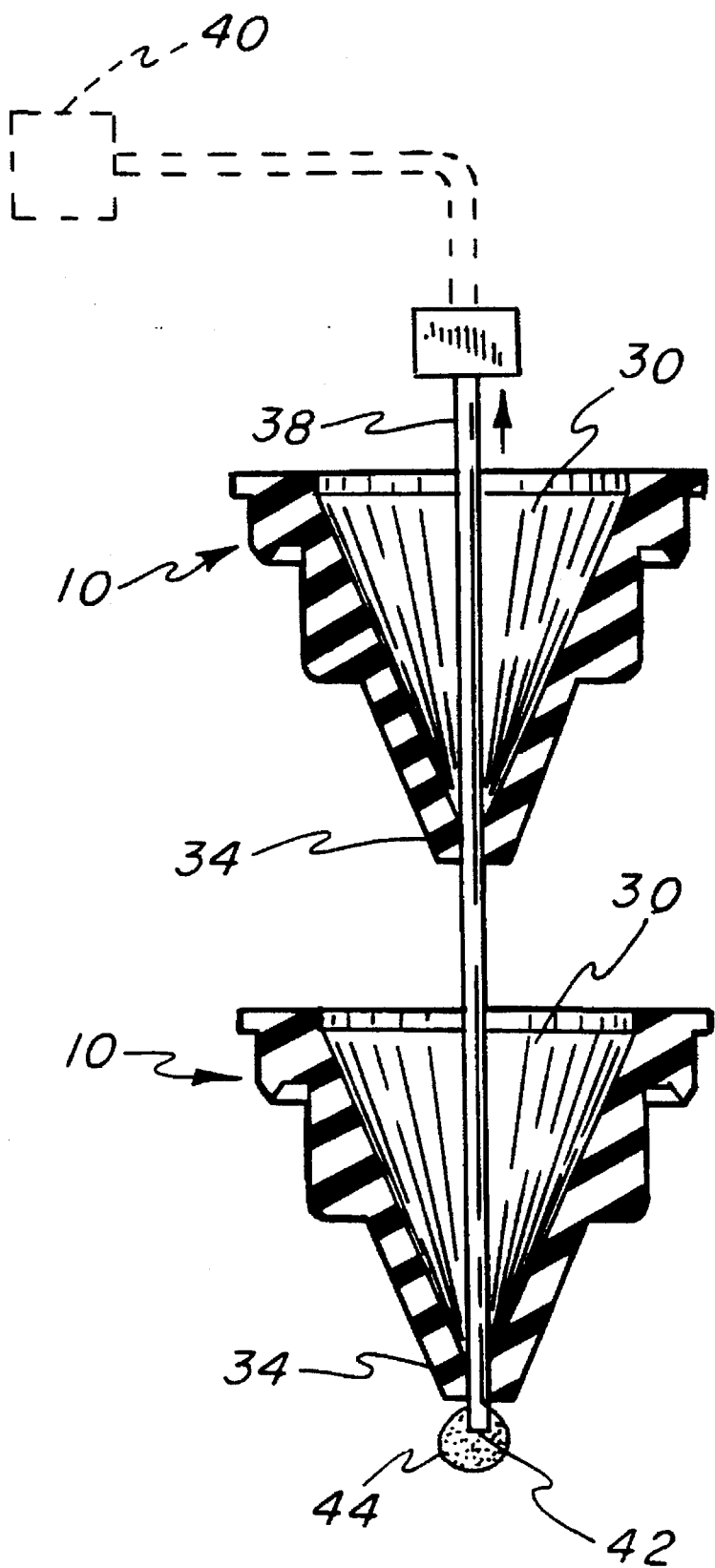
FIG. 7 is a sectional view illustrating a technique for providing a non-stick treatment to a series of valves.

Referring to FIG. 7, an alternative arrangement for coating regulators is illustrated wherein the regulators 10 are arranged in series or end to end relationship. In this arrangement, the needle 38 is first inserted through all of the regulators 10, and the microdrop 44 is formed at the tip end 42 of the needle 38 just prior to withdrawal of the needle 38 through the slit 34 for each regulator 10. Thus, the microdrop 44 will wet across the surfaces defining the slit 34 for each regulator 10 to form a non-stick fluid film coating as the needle 38 is extracted from the slit 34.

It should be noted that in order to obtain the desired coating characteristics, the non-stick lubricating fluid is supplied at a viscosity which permits it to be wetted across the slit surfaces and to remain in position coating the surfaces. For example, it has been found that providing the non-stick lubricating fluid at a viscosity of 300 centistoke provides satisfactory coating characteristics, although other viscosities may be used. In addition, a very small quantity of the non-stick lubricating fluid is preferably provided to the slit, such as a microdrop of approximately ¼ to 1 microliter. The size of the microdrop may be varied to accommodate variations in the area to be coated. By supplying a microdrop 44 of the non-stick material to each one of a batch or production run of regulators 10, opening of each regulator 10 formed by the present method is substantially ensured.

Referring to FIG. 8, a histogram illustrating the test results from 300 samples of regulators formed without the non-stick coating and 300 samples formed with the non-stick coating of the present invention is provided. The regulators produced without the non-stick coating are indicated by the solid bar lines and the regulators produced with the non-stick coating are indicated by the dotted bar lines, and the horizontal axis of the histogram indicates the pressure (in inches of water) required to open the valve in a forward flow direction while the vertical axis indicates the number of sampled parts which opened at the particular pressures. It should be noted that for the particular valve sampled, the desired maximum opening pressure was 8" of water and that the valves produced without the non-stick coating included a substantial number which opened above the desired maximum pressure.

Further, it should be noted that the valves provided with the non-stick coating of the present invention produced test results substantially falling within a bell curve distribution centered on a pressure of approximately 3.5" of water. Further, each of the regulators coated with the non-stick coating opened at pressures less than the desired maximum of 8" of water. Thus, it should be apparent that the present invention consistently ensures initial opening of valves for a large sample group of valves provided with a non-stick coating.

Although the present invention has been described with specific reference to providing a silicone valve with a fluorosilicone fluid coating, other substances may be used within the scope of the present invention. For example, if the regulator is constructed of a fluorosilicone elastomer, a dimethylsilicone fluid may be used. Alternatively, a phenylsilicone fluid may also be used as a lubricating coating, for example, on a silicone part. Other combinations of coatings and regulator materials may be provided, as long as the coatings are formed of a different material than the regulator material such that the coating and regulator are substantially incompatible resulting in the coating remaining on the outer surface of the regulator.

Further, it should be noted that the present non-stick treatment is not necessarily limited to use on the particular valve structure disclosed herein and may be used on other valve structures incorporating cooperating resilient surfaces for controlling fluid flow.

The above described non-stick coating for valves has several advantageous characteristics including having a long shelf life whereby the non-stick coating ensures that the valve will open after an extended period of time with the lip surfaces 36 in contact with each other. In addition, the coating is substantially unaffected by standard medical cleaning processes such as gamma radiation, autoclaving and ETO ethylene oxide gas cleaning.

From the above description, it should be apparent that the present invention provides a regulator valve having a non-stick coating wherein the non-stick coating may be applied during production of the valve to ensure operation of the valve within desired performance parameters. Further, it should be apparent that the non-stick coating provided by the present invention is durable such that performance of the regulator member is ensured over an extended period of time.

While the form of the invention herein described constitutes a preferred embodiment of this invention, it is to be understood that the invention is not limited to this precise embodiment, and that changes may be made therein without departing from the scope of the invention which is defined in the appended claims.

What is claimed is:

1. A non-stick treated valve comprising:
   a pair of cooperating elastomeric surfaces positioned to engage each other to control fluid flow through said valve; and
   a non-stick coating applied to said cooperating surfaces to facilitate separation of said cooperating surfaces from each other.

2. The valve as recited in claim 1 wherein said non-stick coating comprises a fluid lubricant.

3. The valve as recited in claim 1 wherein said non-stick coating is substantially immiscible in blood and plasma.

4. The valve as recited in claim 1 wherein said non-stick coating comprises a lubricious substance.

5. The valve as recited in claim 1 wherein said non-stick coating comprises a fluorosilicone lubricant.

6. The valve as recited in claim 1 wherein said cooperating surfaces are formed of a first material and said non-stick coating is formed of a second material dissimilar from said first material.

7. The valve as recited in claim 6 wherein said first material comprises a cross-linked polymer and said second material comprises a non-cross-linked polymer.

8. The valve as recited in claim 7 wherein said first material comprises silicone elastomer and said second material comprises fluorosilicone fluid.

9. The valve as recited in claim 7 wherein said second material comprises a fluid film coating on said first material.

10. The valve as recited in claim 1 wherein said cooperating surfaces are defined on opposing sides of a fluid passage through said valve.

11. The valve as recited in claim 1 wherein said valve comprises a duckbill valve having substantially planar lips connected by curved side portions, and said cooperating surfaces are defined along a line of contact between said lips.

12. The valve as recited in claim 1 wherein said non-stick coating is substantially resistant to gamma radiation treatment of said valve.

13. A duckbill valve including a valve body having a pair of opposed lips connected by side walls to form a fluid passage through the valve, said lips having inner surfaces extending in converging relation to define a slit at an outlet end of the valve, the improvement comprising:
   a non-stick coating applied to said inner surfaces of said lips at said slit to facilitate opening of said valve.

14. The valve as recited in claim 13 wherein said non-stick coating is substantially immiscible in blood and plasma.

15. The valve as recited in claim 13 wherein said non-stick coating comprises a lubricious substance.

16. The valve as recited in claim 13 wherein said non-stick coating comprises a polymeric material.

17. The valve as recited in claim 16 wherein said polymeric material is a fluid.

18. The valve as recited in claim 13 wherein said valve body is formed of a first material and said non-stick coating is formed of a second material dissimilar from said first material.

19. The valve as recited in claim 18 wherein said first material comprises a cross-linked polymer and said second material comprises a non-cross-linked polymer.

20. The valve as recited in claim 18 wherein said second material comprises fluorosilicone fluid.

21. The valve as recited in claim 18 wherein said second material comprises phenylsilicone fluid.

22. The valve as recited in claim 18 wherein said second material comprises dimethylsilicone fluid.

23. A method of forming a non-stick treated valve including the steps of:
   providing a valve body having opposed cooperating surfaces for controlling fluid flow through said valve body;
   moving dispensing means into association with said cooperating surfaces; and
   dispensing a non-stick material from said dispensing means onto said cooperating surfaces.

24. The method as recited in claim 23 wherein said valve includes a slit defined by said cooperating surfaces and said step of moving said dispensing means includes penetrating said slit with said dispensing means.

25. The method as recited in claim 23 wherein said dispensing means comprises a hollow needle and said step of dispensing a non-stick material comprises dispensing a lubricating fluid through said needle.

26. The method as recited in claim 23 wherein said valve comprises a duckbill valve having a normally closed end and a slit cut at said normally closed end to form said cooperating surfaces, said dispensing means comprising a hollow needle, said step of moving said dispensing means further comprising moving said needle into an open end of said valve and through said slit, and said step of dispensing a non-stick material further comprising dispensing a lubricious lubricating fluid through said needle.

27. The method as recited in claim 23 wherein said valve comprises a duckbill valve having a normally closed end and a slit cut at said normally closed end to form said cooperating surfaces, the method further comprising forming a microdrop of said non-stick material on an end of said needle and subsequently moving said needle through said slit to coat said cooperating surfaces with said non-stick material.

* * * * *